United States Patent
Lafontaine (10) Patent No.: US 7,560,905 B2
(45) Date of Patent: *Jul. 14, 2009

(54) VEHICLE STEERING WHEEL POWER SWITCH APPARATUS AND METHOD

(75) Inventor: Yvan Lafontaine, Grand-Mère (CA)

(73) Assignee: Teleflex Megatech, Inc., Grand-Mere, Quebec (CA)

( * ) Notice: Subject to any disclaimer, the term of this patent is extended or adjusted under 35 U.S.C. 154(b) by 465 days.

This patent is subject to a terminal disclaimer.

(21) Appl. No.: 11/236,571

(22) Filed: Sep. 28, 2005

(65) Prior Publication Data
US 2008/0106237 A1    May 8, 2008

Related U.S. Application Data

(63) Continuation-in-part of application No. 10/961,297, filed on Oct. 12, 2004, now Pat. No. 7,405,540.

(60) Provisional application No. 60/516,757, filed on Nov. 4, 2003, provisional application No. 60/512,100, filed on Oct. 20, 2003, provisional application No. 60/512,089, filed on Oct. 20, 2003.

(51) Int. Cl.
*H01M 10/44* (2006.01)
*H01M 10/46* (2006.01)

(52) U.S. Cl. ..................................... 320/166
(58) Field of Classification Search ............... 320/108, 320/166; 307/112, 116, 149
See application file for complete search history.

(56) References Cited

U.S. PATENT DOCUMENTS 4,628,310 A * 12/1986 Reighard et al. ....... 340/825.72
6,264,513 B1 * 7/2001 Marsh .......................... 440/53

* cited by examiner

*Primary Examiner*—Edward Tso
(74) *Attorney, Agent, or Firm*—Baker & Hostetler LLP

(57) ABSTRACT

A method and system for powering at least one switch provided on the steering wheel assembly of an off road vehicle. The method or system includes providing a rechargeable accumulator in the steering wheel assembly and powering the switch from the accumulator. The method or system also includes an energy source for recharging the accumulator along with the step of comparing a detected energy level and/or a detected time elapsed to a threshold value corresponding to the energy level being sufficient to power the switch and enable its use. Said aforementioned step is utilized to determine if there is energy sufficiency or an energy insufficiency in the accumulator. If the comparison yields an energy insufficiency, the energy source may be instructed to recharge the accumulator, and hence increase its energy level. The above discussed steps may be repeated to ensure the sufficiency of the energy level to power the switch.

28 Claims, 6 Drawing Sheets

VEHICLE STEERING WHEEL POWER SWITCH APPARATUS AND METHOD

CROSS-REFERENCE TO RELATED APPLICATIONS

This application is a Continuation-In-Part of U.S. patent application Ser. No. 10/961,297, filed on Oct. 12, 2004, now U.S. Pat. No. 7,405,540 which claims priority under 35USC§119(e) of U.S. provisional patent applications 60/512,089, filed on Oct. 20, 2003, entitled "Contactless Steering Wheel Switch Powering"; 60/512,100,filed on Oct. 20, 2003, entitled "Contactless Steering Wheel Switch Powering"; and 60/516,757, filed on Nov. 4, 2003, entitled "Status Light on a Marine Vehicle Steering Wheel Switch", by applicant, the specifications of which are hereby incorporated by reference.

FIELD OF THE INVENTION

The present invention relates to switches made available on steering wheels of vehicles. More specifically, it relates to supplying power to the switches made available on steering wheels of off road vehicles, such as all-terrain vehicles, dirt bikes, motorized snow vehicles or amphibious vehicles, as well as vehicles which are designed for industrial use in agriculture, forestry, mining or construction; independently of whether the steering wheel is powered by the vehicle main battery or not.

BACKGROUND OF THE INVENTION

Many electrical subsystems are used on marine vehicles and other off road vehicles. A good example is the sound producing device marine vehicles are required to have. In order to comply with typical navigation rules, and for distress signaling purposes, all marine vehicles must typically carry a sound producing device (whistle, horn, siren, etc.) capable of a 4-second blast audible for ½ mile. Marine vehicles larger than 12 m are also usually required to have a bell. The sound producing device, as well as many other subsystems, are generally operated by the user of the marine vehicle who activates a corresponding switch. On luxury boats, there are many subsystems and many subsystem switches. The subsystem switches are often provided as an alignment of similar switches disposed side by side on the dashboard of the marine vehicle, and selecting the appropriate switch for activating a subsystem is confusing. In current systems, the switches disposed on the dashboard of marine vehicles are powered by the marine vehicle battery power.

Since the switches are not provided at an intuitive position for the user, a dangerous delay may result when the user tries to activate the corresponding subsystem in the event of an emergency.

SUMMARY OF THE INVENTION

Accordingly, an object of the present invention is to provide energy to switches located on the steering wheel of an off road vehicle to enable subsystem activation independently of whether the steering wheel assembly is being powered by the off road vehicle main power supply or not.

According to a broad aspect of the invention, there is provided a method for powering at least one subsystem switch provided on a steering wheel assembly of an off road vehicle. The method comprises: providing a rechargeable accumulator having an energy level, in the steering wheel assembly; powering the switch from the accumulator; providing an energy source in the off road vehicle, able to induce recharge energy into the accumulator; comparing at least one of a detected value of the energy level with an energy threshold value corresponding to a value of the energy level sufficient to power the at least one switch and enable its use, and a detected time elapsed since recharge energy was induced into the accumulator with a time threshold value corresponding to a time after which the energy level equals the energy threshold value; determining one of a sufficiency and an insufficiency of the energy level upon said comparison; if the comparison yields the insufficiency, instructing the energy source to recharge the accumulator, thereby increasing the energy level; and repeating the steps of comparing, determining, and instructing thereby ensuring the sufficiency.

According to a broad aspect of the invention, there is provided a system for powering at least one subsystem switch provided on a steering wheel assembly of an off road vehicle, comprising: a rechargeable accumulator in the steering wheel assembly, capable of supplying energy to the at least one switch, and comprising an energy level; an energy source in the off road vehicle able to induce recharge energy into the accumulator; a comparator for comparing at least one of an actual value of the energy level detected by a detector with a provided energy threshold value corresponding to a value of the energy level sufficient to power the at least one switch and enable its use, and an actual value of time elapsed since recharge energy was induced into the accumulator with a provided time threshold value corresponding to a time after which the energy level equals the energy threshold value, the time elapsed being monitored by a discharge timer, and determining one of a sufficiency and an insufficiency of the energy level upon said comparison; and a controller for instructing the energy source to recharge the accumulator thereby increasing the energy level, if the comparison yields the insufficiency; wherein the comparator, and the controller are capable of continually repeating the comparing, determining, and instructing to ensure the sufficiency.

According to a broad aspect of the invention there is provided a method and system for powering at least one switch provided on the steering wheel assembly of an off road vehicle. The method or system comprises: providing a rechargeable accumulator in the steering wheel assembly; powering the switch from the accumulator; providing an energy source; comparing a detected energy level and/or a detected time elapsed to a threshold value corresponding to the energy level being sufficient to power the switch and enable its use, to determine if there is energy sufficiency or an energy insufficiency in the accumulator; if the comparison yields an energy insufficiency, instructing the energy source to recharge the accumulator, and hence increase its energy level; and repeating the steps of comparing, determining, instructing and recharging thereby ensuring sufficiency of the energy level to power the switch.

While the description of the preferred embodiment has been made with respect to a subsystem switch provided on a steering wheel assembly of a marine vehicle, the method and system of the present invention could be used with a plurality of other "off road" vehicles. An "off road" vehicle is used to refer to any motor vehicle designed or adapted for off-road use, without limiting the generality of the foregoing, such as: all-terrain vehicles, dirt bikes, motorized snow vehicles or amphibious vehicles, as well as vehicles which are designed for industrial use in agriculture, forestry, mining or construction.

BRIEF DESCRIPTION OF THE DRAWINGS

These and other features, aspects and advantages of the present invention will become better understood with regard to the following description and accompanying drawings wherein.

DETAILED DESCRIPTION OF THE PREFERRED EMBODIMENT

The present invention provides a rechargeable accumulator for providing energy to subsystem switches located on the steering wheel when the ignition switch is turned OFF. When the ignition switch is turned ON, the steering wheel assembly, which comprises the steering wheel, the subsystem switches, the accumulator and other components assembled to the steering wheel, is powered by the vehicle main battery. Hence, the switches are powered and the accumulator is recharged. During long periods of vehicle inactivity, the accumulator progressively loses its charge. In order to maintain a sufficient charge to power the subsystem switches at all times, the present invention triggers the recharge of the accumulator when its energy level drops below a determined threshold value. Hence, the subsystem switches may be activated by a user to actuate a subsystem even when no power from the main battery is received by the steering wheel assembly.

In marine vehicles, the steering wheel rotates more turns in each direction than in steering wheels of cars. Also, in other off road vehicles, vibration can cause malfunction of brush-type systems, and friction around moving cables is amplified by dust contamination. consequently, the use of a twisted wire for powering the steering wheel assembly from a main power source, as used in cars, is rendered more difficult to apply to a marine vehicle application. As discussed in the present description, the use of a transformer for contactlessly transmitting energy from the fixed hub assembly to the pivoting steering wheel assembly has been found to be appropriate, since this usage does not limit the quantity of complete turns the steering wheel may do.

Figure 1:
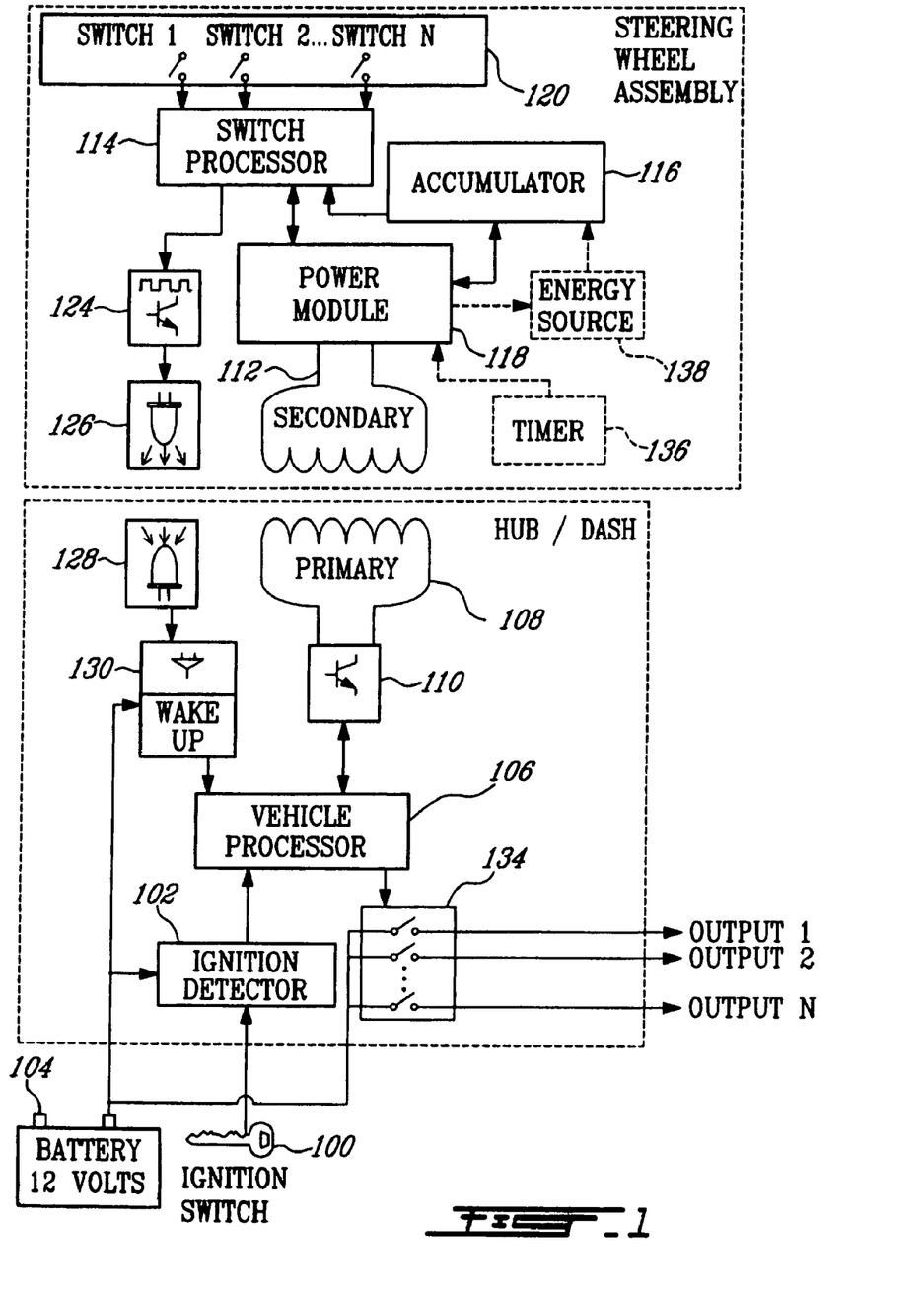
FIG. 1 is a block diagram of the main components of a preferred embodiment of the present invention.

With reference to FIG. 1, a block diagram of the preferred embodiment will now be described. When the ignition switch 100 is turned on, an ignition detector 102 allows the typically 12 Volt battery 104 of the marine vehicle to power the vehicle processor 106 provided in the hub or the dashboard of the marine vehicle. When the vehicle processor 106 is powered, it generates a waveform which will drive the primary 108 of the contactless rotary transformer (108, 112) via power transistors 110. The activation of the primary 108 in the hub, will contactlessly induce electric energy to the secondary 112 of the contactless rotary transformer which is located in the steering wheel assembly. This electric energy is then used to power a switch processor 114 and to recharge an accumulator 116 via a power module 118, all located in the steering wheel assembly. The accumulator 116 is preferably an electrical accumulator such as a capacitor, a high-value capacitor, an ultra-capacitor, or a rechargeable battery, and has an energy capacity sufficient to power the subsystem switches 120 independently of whether the steering wheel assembly is powered by the battery or not.

Note that in the present description, the expressions "dashboard", "hub", or "hub assembly" may include any portion of the boat which is not part of the steering wheel assembly; the expressions "hub" and "hub assembly" include the non-rotating parts of the marine vehicle in which the steering wheel assembly pivots.

Subsystem switches 120 on steering wheels of marine and other off road vehicles can be used to control a plurality of subsystems of the marine vehicle, such as the lights, the horn, the ventilation fan, the windshield wiper and washer, the bilge pump and blower, the emergency starter, the anchor, the hazard warning, the radio, the trim tab, the power trim, etc. The subsystem switches 120 can be provided on a keypad that is affixed to the steering wheel. This keypad should be weather resistant if the steering wheel is not protected from the weather. The subsystem switches will typically bear pictograms or logos representing the sub-system that they control. They can also bear the name of the sub-system. Switch standards exist for marine and other off road vehicles and should be respected when appropriate.

The switch processor 114 reads the electrical signals from the subsystem switches 120 of the steering wheel assembly and transmits data concerning the switch activation towards the vehicle processor. Typically, infrared (IR) data transmission is used. The preferred IR transmission includes a data driver 124 for creating a data train, and an IR emitting diode 126 for emitting the data train. The data train comprises information on the switch(es) activated in the steering wheel and therefore contains an indication of the command to which each subsystem must react. The data train is then captured by a phototransistor 128, and received by a signal receiver 130, that sends it to the vehicle processor 106 for communication with the proper subsystem of the marine vehicle via an interface 134.

The interface 134 has as at least as many outputs as there are subsystem switches 120 on the steering wheel. It can comprise steady state interface switches or electromechanical relays. It is possible to use the interface 134 to communicate on a data network of the vehicle, in which case it will comprise a multiplexer. The National Marine Electronics Association has introduced the NMEA 2000 interface standard. The standard contains the requirements of a serial data communications network to inter-connect marine electronic equipment on vessels. It is multi-master and self-configuring, and there is no central network interface. Equipment designed to this standard have the ability to share data, including commands and status, with other compatible equipment over a single channel. If the interface 134 is compliant with the NMEA 2000 standard, it can allow communication between the switches 120 and the subsystems on the network. Other network standard also exist like SAEJ1939, RVC, CAN OPEN, LIN and so on.

When the ignition switch 100 is turned off, the ignition detector 102 cuts the power from the battery, and the vehicle processor 106 ceases to generate a waveform and drive the primary 108 of the transformer. The steering wheel assembly is thereon only powered by the energy available in the accumulator 116. This state is called the "waiting mode".

In the waiting mode, the level of stored energy in the accumulator decreases. If the level of energy decreases below a critical value, the level of energy in the accumulator will be insufficient to power the switches and to allow transmission of the switch activation information. A threshold value is determined, at least equal to but preferably greater than the critical value, and when the energy level reaches the threshold value, a command is sent to allow the battery of the marine vehicle to temporarily power the steering wheel assembly in order to recharge the accumulator.

In the preferred embodiment, the power module 118 has an integrated energy level detector, such as a voltmeter, to detect when the energy level in the accumulator has reached the threshold value. It then communicates this information to the switch processor 114. The switch processor sends a recharge command through the data driver 124 and the IR emitting diode 126. A phototransistor 128 captures the charge command and a wake-up circuitry in the receiver 130 requests that the vehicle processor 106 generate a waveform to charge the steering wheel accumulator, bypassing the fact that the ignition switch is turned off. Once the accumulator 116 is fully charged, the power module 118 can indicate to the vehicle processor 106 that the charge is complete and the system can go back to its waiting mode.

In the preferred embodiment, communication is achieved via infrared transmission, as described. In other embodiments, communication between the hub/dash and the steering wheel assembly can be achieved by different means suitable to the application. For example, radio frequency, ultrasound transmission, high frequency modulation through the transformer or electromagnetic transmission may alternatively be used.

Another embodiment of the invention uses a timer 136 to determine a time at which the energy of the accumulator has most likely fallen below the threshold value. Depending on the type of accumulator used, it may be possible to experimentally measure the amount of time it takes for the accumulator energy level to fall below the threshold value. Once this amount of time has been determined, a timer 136 is set to automatically trigger the recharging of the accumulator 116 after this amount of time has elapsed since the last recharge.

Furthermore, a combination of timers may be used. For example, if the accumulator used is a battery, that its energy level has been determined to be at a threshold value of 50% of total capacity after two hours of waiting, and that it is known to take two minutes to recharge back to 100% of total capacity, a discharge timer commands the power module 118 to recharge the accumulator every two hours, and a recharge timer commands the recharge to last for a period of two minutes, in order to keep the switch system 120, 114, and transmission system 124, 126, 128, 130, ready for subsystem activation. In different applications, the event that triggers the discharge timer may be chosen to be either the beginning or the end of the recharge. In some cases, the recharge time is much smaller than the discharge time, and therefore either choice is approximately equivalent.

It may further be possible to use both the timer and the energy level detector and transmitter in order to achieve various results of automatic accumulator 116 recharging. The recharge may hence be automatically commanded to begin after a predetermined period of time calculated by the timer 136 has expired, but only once the energy accumulator 116 is detected to be at full capacity. Alternatively, the recharge may be started when the energy level is found to have reached the threshold value, and last for a period of time calculated by a timer 136. Many other combinations of timer and energy level threshold values will be evident to those skilled in the art.

In another embodiment of the invention, a secondary energy source 138 from which the accumulator receives and stores energy is part of the steering wheel assembly. An example of such a secondary energy source would be a solar panel 138 disposed on the steering wheel of the vehicle, that can transform the energy from sunlight into electric recharge energy and recharge the accumulator 116. The solar panel 138 may either apply recharge energy to the accumulator 116 in a direct manner, or be controlled by the power module 118. In the latter case, the power module 118 may be equipped to detect whether there is enough sunlight to recharge the battery to activate the recharge from the solar panel only if the sunlight is sufficient. The power module 118 may also limit the solar panel induced recharge to when an insufficiency of energy is detected in the accumulator. A secondary source recharge control may also be provided directly as part of the solar panel. In practice, variations in the intensity of the sunlight will result in voltage variations at the output of the solar panel. It is only if the output voltage is sufficient and if the accumulator is not at full capacity that effective recharge of the accumulator is possible. The use of a solar panel may help reduce the discharging rate of the main battery due to repetitive recharges of the accumulator over a long period of time.

Figure 2:
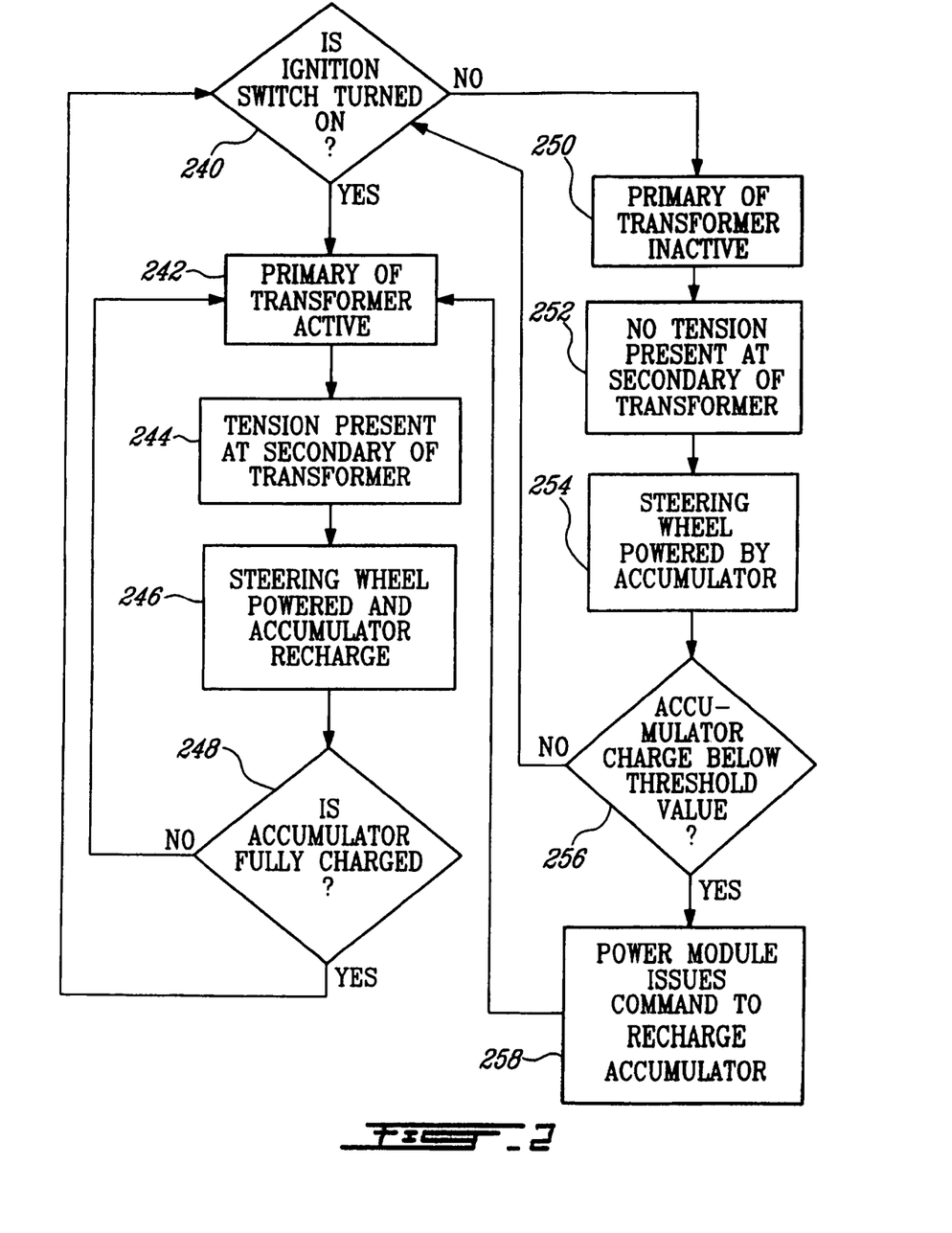
FIG. 2 is a flow chart of the main steps of a preferred method of the present invention.

With reference to FIG. 2, the main steps of the preferred method will now be described. A verification is made as to whether the ignition switch is turned on 240. If it is, the primary of the transformer is activated 242 by the power from the vehicle battery. Tension is then present at the secondary of the transformer 244. The steering wheel assembly is then powered up and the accumulator can recharge 246.

A verification is made as to whether the accumulator is fully charged 248. If it is, the process loops back to checking whether the ignition switch is turned on 240. If the accumulator is not fully charged 248, the process loops back to activating the primary of the transformer 242. In one embodiment, the accumulator is kept under tension, thereby being continually recharged, for as long as the steering wheel assembly is powered by the main battery. However, it is also possible for a component of the system, like the power module for example, to cut off the tension to the accumulator when the energy level in the accumulator is detected to correspond to full capacity.

If the ignition switch is not turned on 240, the primary of the transformer is inactive 250.

There is therefore no tension present at the secondary of the transformer 252. The switches are therefore operating on the steering wheel accumulator power 254.

A verification is then made as to whether the accumulator charge has fallen below a threshold value 256. If the threshold value has not been reached, the process loops back to checking the ignition switch 240. However, if the threshold value has been reached 256, a command is issued to the vehicle processor indicating to begin recharging the accumulator 258. The primary of the transformer is then excited 242 and the process loops until the accumulator is fully charged 248.

Figure 3:
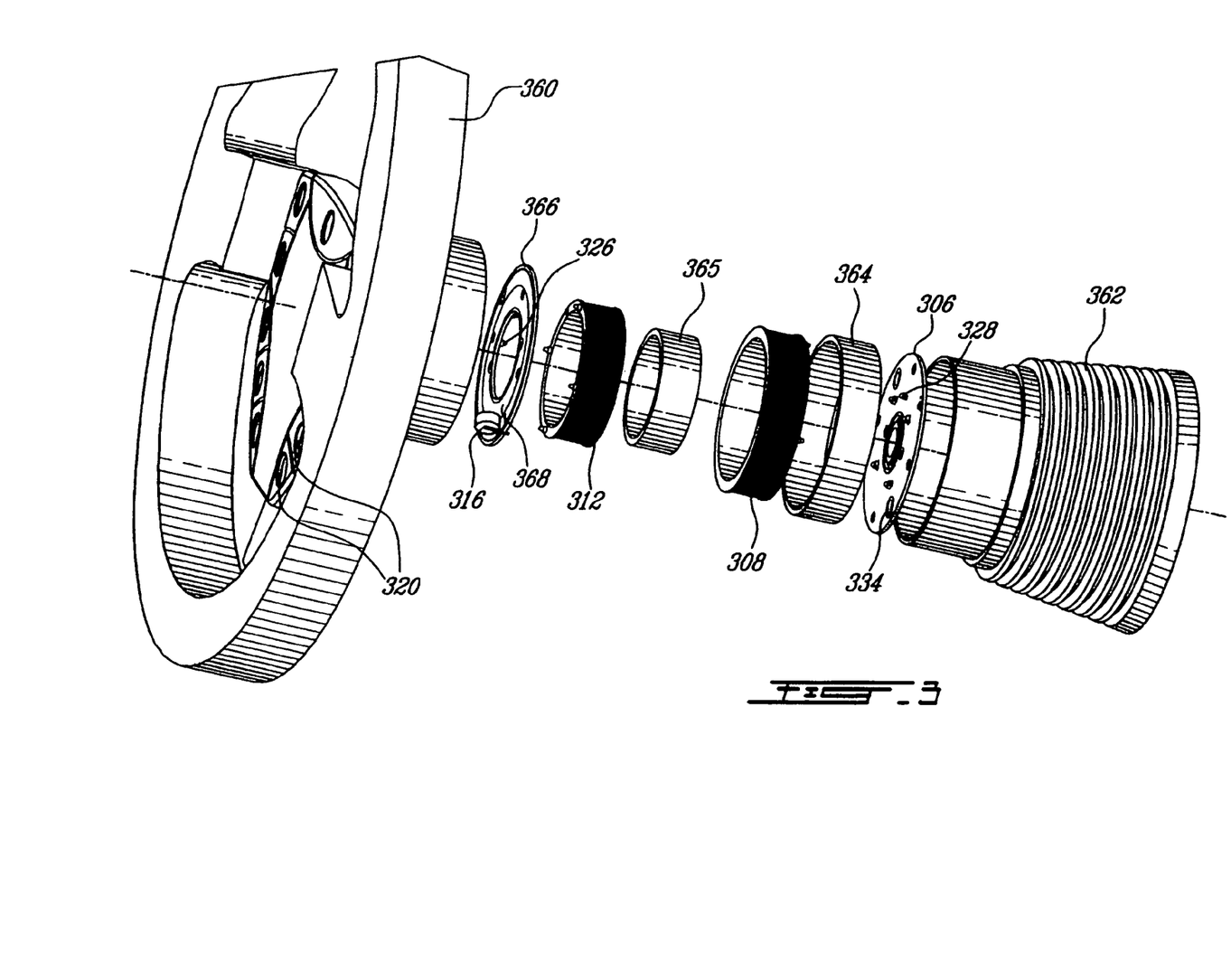
FIG. 3 is an exploded perspective view of the steering wheel and hub component assembly according to the present invention.

FIG. 3 is an exploded view of the steering wheel and hub component assembly of the preferred embodiment. The steering wheel 360 is free to rotate within the hub bellow 362. A first printed circuit board 306 is provided in the hub assembly with solid state switches 334 and the infrared signal receivers 328. A first 364 and a second 365 ferromagnetic cores surround the primary 308 and the secondary 312 of the rotary transformer. There is no contact between the primary 308 and the secondary 312. The primary 308 is affixed to the hub assembly and the secondary 312 is affixed to the steering wheel assembly. A second printed circuit board 366 is provided within the steering wheel assembly and bears the accumulator 316, the infrared emitter 326 and a switch circuitry 368. The switches 320 are provided on the steering wheel 360.

Figure 4:
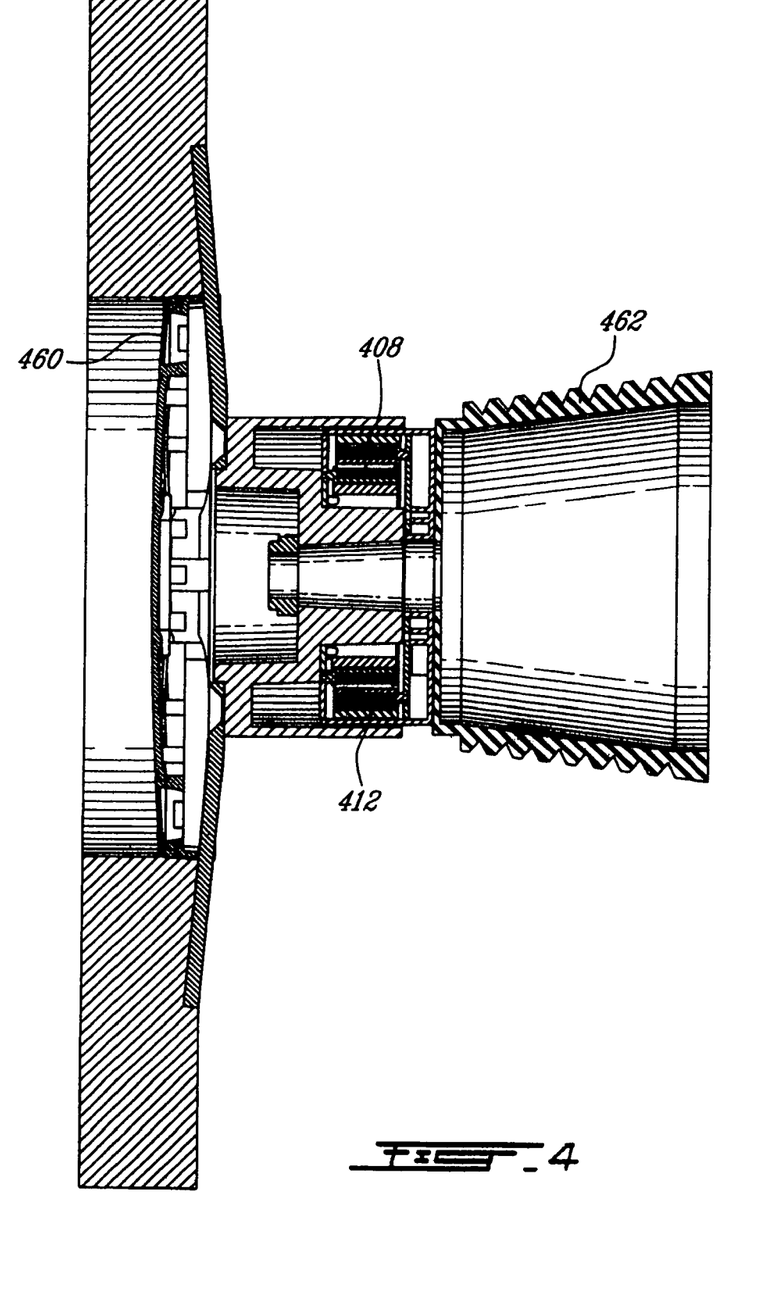
FIG. 4 is a sectional view of the assembled steering wheel and hub component assembly of FIG.3.

FIG. 4 is a sectional view of the steering wheel and hub component assembly of FIG. 3. The rotary transformer has a first ring shaped magnet core 364 with the primary coil 408 composing the stator and a second ring shaped magnet core 365 with the secondary coil 412 composing the rotor. The stator is located in the hub bellow 462, and the rotor is provided in the steering wheel 460. There is an air gap between the two coils making them entirely contactless. A soft magnetic material is used for these cores to make the magnetic resistance appearing in the magnetic circuit of the two coils small enough, so that an AC electric energy impressed on the primary coil is transmitted to the secondary coil instantaneously.

Figure 5:
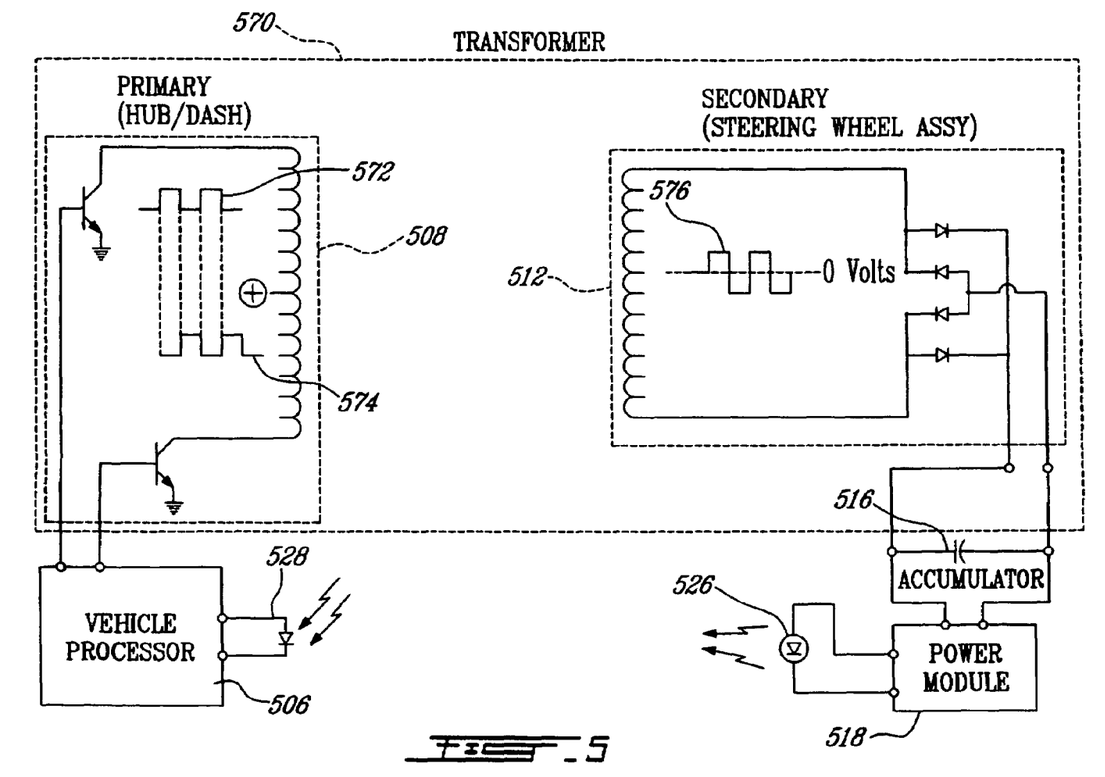
FIG. 5 is an exemplary circuitry with sample signal waveforms of the transformer.

FIG. 5 is an example of a preferred circuit for the invention and corresponding transformer waveforms. The transformer 570 comprises a primary 508, and a secondary 512. The control circuit 506 acts as an intermediary between the phototransistor 528 and the primary 508. The power module 518 acts as an intermediary between the IR emitter 526, and the secondary 512. In this embodiment, the accumulator 516 is powered directly by the secondary 512. Also illustrated is an example of a pair of primary waveforms 572, 574, and a corresponding secondary waveform 576.

Figure 6:
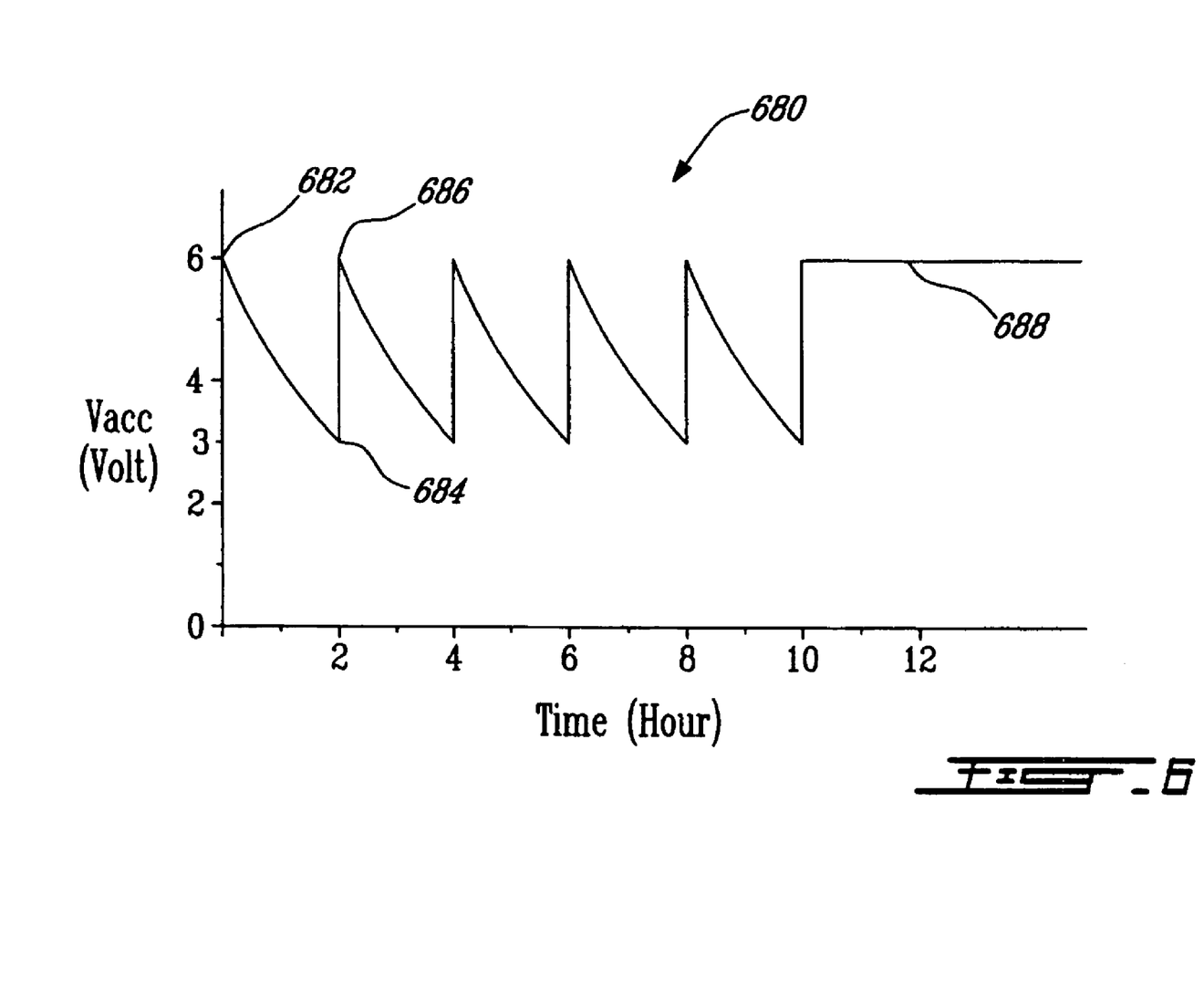
FIG. 6 is an example of the variation of energy level with time in the accumulator.

FIG. 6 is an example of the energy level variation with time 680 in the accumulator. At time zero 682, the ignition switch is turned OFF. The voltage in the accumulator is at 6 Volts, and the accumulator is fully charged. After two hours without the ignition switch being turned ON, the accumulator has discharged and its voltage is at the threshold value which has been determined to be 3 Volts 684. This voltage is detected and triggers the charge request. The charging of the accumulator by the transformer takes about one minute 686 (represented as almost instantaneous on the time line in hours). When the accumulator charge reaches 6 Volts, the charge request stops and about 2 hours pass before a further charge request is generated.

After 10 hours, the ignition switch has been turned on in the example graph and the accumulator is continuously recharged by the main battery of the marine vehicle. A 6 Volt charge 688 is then maintained until the ignition switch will be turned OFF again.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A method for powering at least one subsystem switch provided on a steering wheel assembly of an off road vehicle, comprising:
   providing a rechargeable accumulator having an energy level, in said steering wheel assembly;
   powering said switch from said accumulator;
   providing an energy source in said off road vehicle, able to induce recharge energy into said accumulator; comparing one of
   a detected value of said energy level with an energy threshold value corresponding to a value of said energy level sufficient to power said at least one switch and enable its use, and
   a detected time elapsed since recharge energy was induced into said accumulator with a time threshold value corresponding to a time after which said energy level equals said energy threshold value,
   determining one of a sufficiency and an insufficiency of said energy level upon said comparison;
   if said comparison yields said insufficiency, instructing said energy source to recharge said accumulator, thereby increasing said energy level; and
   repeating said steps of comparing, determining, and instructing thereby ensuring said sufficiency.

2. The method of claim 1 wherein said energy source is a main power supply of said off road vehicle and said marine vehicle further comprises an ignition switch capable of being in one of an ON and an OFF state and, said method further comprising:
   detecting said state; and
   inducing energy from said main power supply into said accumulator upon detection of said ON state.

3. The method of claim 2 further comprising powering said switch from said main power supply upon detection of said ON state.

4. The method of claim 1 wherein said vehicle further comprises an ignition switch capable of being in one of an ON and OFF state and said energy source is a main power supply of said off road vehicle, said method further comprising:
   detecting said state; and
   powering said switch from said main power supply upon detection of said ON state.

5. The method of claim 1 wherein said energy source is a main power supply of said off road vehicle, said marine vehicle further has a transformer for transferring energy from a hub assembly of said off road vehicle to said steering wheel assembly, and wherein said step of instructing to recharge comprises:
   activating a primary of said transformer upon said instruction, said primary being powered by said main power supply and being provided within said hub assembly of said off road vehicle;
   inducing tension at a secondary of said transformer from said activated primary, said secondary being provided in said steering wheel assembly; and
   recharging said accumulator from said tension induced at said secondary.

6. The method of claim 1 further comprising:
   providing a secondary energy source able to receive solar energy; converting said solar energy into support energy; and
   inducing said support energy into said accumulator.

7. The method of claim 6 further comprising
   determining if said solar energy is converted to an amount of said support energy that is sufficient to one of increase, maintain and diminish decrease of said energy level;
   wherein said inducing comprises triggering said inducing if said solar energy is determined to be sufficient.

8. The method of claim 1 wherein said switch corresponds to a subsystem of said off road vehicle, said method further comprising:
   activating said switch by a user, and actuating said corresponding subsystem upon said activation.

9. The method of claim 1 wherein said time threshold value is determined by measuring elapsed time for said energy level to decrease from a maximal value to a minimal value corresponding to a minimum of said energy threshold value, when no recharge has taken place during said elapsed time.

10. The method of claim 1 wherein said energy threshold value is determined by measuring a minimal energy level at which said use of said switch is enabled.

11. The method of claim 1 wherein said energy source is a main power supply of said off road vehicle and said off road vehicle further comprises a hub assembly, further comprising communicating said instruction from said steering wheel assembly to said hub assembly of said off road vehicle.

12. The method of claim 11 wherein said communicating comprises: generating a data train comprising said instruction, emitting said data train, capturing said data train, receiving said data train.

13. The method of claim 1, wherein said off road vehicle is a forestry vehicle.

14. A system for powering at least one subsystem switch provided on a steering wheel assembly of a off road vehicle, comprising:
- a rechargeable accumulator in said steering wheel assembly, capable of supplying energy to said at least one switch, and having an energy level;
- an energy source in said off road vehicle able to induce recharge energy into said accumulator;
- a comparator for comparing one of
- an actual value of said energy level detected by a detector with a provided energy threshold value corresponding to a value of said energy level sufficient to power said at least one switch and enable its use, and
- an actual value of time elapsed since recharge energy was induced into said accumulator with a provided time threshold value corresponding to a time after which said energy level equals said energy threshold value, said time elapsed being monitored by a timer,
- and determining one of a sufficiency and an insufficiency of said energy level upon said comparison; and
- a controller for instructing said energy source to recharge said accumulator thereby increasing said energy level, if said comparison yields said insufficiency; wherein said comparator, and said controller are capable of continually repeating said comparing, determining, and instructing to ensure said sufficiency.

15. The system of claim 14 wherein said accumulator is one of a capacitor, a high-value capacitor, an ultra-capacitor, and a rechargeable battery.

16. The system of claim 14 wherein said energy source is a main power supply of said off road vehicle.

17. The system of claim 16 further comprising a transformer having a primary in a hub assembly of said off road vehicle and a secondary in said steering wheel assembly, for transmitting energy from said main power supply to said primary, inducing tension from said primary to said secondary, and recharging said accumulator from said tension induced; wherein there is no contact between said primary and said secondary.

18. The system of claim 16 further comprising a transmission device for communicating information of said instruction from said steering wheel assembly to a hub assembly of said off road vehicle.

19. The system of claim 18 wherein said transmission device is an infrared transmission device.

20. The system of claim 19 wherein said infrared transmission device comprises an infrared emitting diode for emitting a data train comprising information of said instruction, and a phototransistor for capturing said data train.

21. The system of claim 20 further comprising a data driver for generating said data train.

22. The system of claim 20 further comprising a receiver for receiving said data train from said phototransistor and activating said main power supply to said recharge.

23. The system of claim 16 further comprising a secondary energy source in said steering wheel assembly, said secondary energy source being able to induce support energy into said accumulator for one of increasing, maintaining, and diminish decreasing of said energy level.

24. The system of claim 23 further comprising an activator for determining if said support energy is sufficient for said induction, and for triggering said induction if said support energy is determined to be sufficient.

25. The system of claim 23 wherein said secondary energy source is a solar panel disposed onto said steering wheel.

26. The system of claim 14 wherein said detector is a voltmeter for detecting a voltage value of said energy level.

27. The system of claim 14 wherein said timer is a discharge timer for determining said insufficiency, further comprising a recharge timer for monitoring a value of time elapsed since said recharge has begun, and for determining said sufficiency.

28. The system of claim 14, wherein said off road vehicle is a forestry vehicle.

* * * * *